(12) United States Patent
Kitatani (10) Patent No.: US 7,084,810 B2
(45) Date of Patent: Aug. 1, 2006

(54) PORTABLE TERMINAL AND GPS TIME KEEPING METHOD

(75) Inventor: Kenichi Kitatani, Tokyo (JP)

(73) Assignee: NEC Corporation, Tokyo (JP)

( * ) Notice: Subject to any disclaimer, the term of this patent is extended or adjusted under 35 U.S.C. 154(b) by 126 days.

(21) Appl. No.: 10/863,273

(22) Filed: Jun. 9, 2004

(65) Prior Publication Data

US 2004/0252052 A1 Dec. 16, 2004

(30) Foreign Application Priority Data

Jun. 10, 2003 (JP) ............................. 2003-165044

(51) Int. Cl.
G01S 1/00 (2006.01)
G01S 5/14 (2006.01)
(52) U.S. Cl. ........................... 342/357.12; 342/357.06; 342/357.13
(58) Field of Classification Search ........... 342/357.06, 342/357.12, 357.13, 418; 701/207, 213
See application file for complete search history.

(56) References Cited

U.S. PATENT DOCUMENTS

| 5,854,605 | A | 12/1998 | Gildea | |
|---|---|---|---|---|
| 5,893,044 | A | 4/1999 | King et al. | |
| 6,246,959 | B1 | 6/2001 | Nakajima | |
| 6,772,361 | B1* | 8/2004 | Walsh | 713/502 |
| 2004/0225439 | A1* | 11/2004 | Gronemeyer | 701/213 |
| 2005/0083230 | A1* | 4/2005 | Harvey et al. | 342/357.06 |
| 2005/0146462 | A1* | 7/2005 | Abraham et al. | 342/357.02 |

FOREIGN PATENT DOCUMENTS

| JP | 2000-332678 A | 11/2000 |
|---|---|---|
| JP | 2002-148372 A | 5/2002 |
| WO | WO 03/008993 A2 | 1/2003 |
| WO | WO 03/029836 A2 | 4/2003 |

* cited by examiner

*Primary Examiner*—Dao L. Phan
(74) *Attorney, Agent, or Firm*—Sughrue Mion, PLLC (57) ABSTRACT

A portable terminal includes a GPS processing unit and RTC oscillator. In the GPS processing unit, a free-run RTC counter continuously counts real time clocks generated by the RTC oscillator even in the power saving mode, a time maintenance processing unit which includes a memory storing the count value of the free-run RTC counter and a notified GPS time upon a shift from a normal power mode to the power saving mode, calculates the duration of the power saving mode from the difference between the count value stored in the memory and the count value read from the free-run RTC counter upon return from the power saving mode to the normal power mode, and calculates the current GPS time by adding the calculated duration of the power saving mode to the stored GPS time upon a shift from the normal power mode to the power saving mode, and a position measurement processing unit performs position measurement by receiving a radio wave from the GPS satellite in the normal power saving mode, also notifies the time maintenance processing unit of the GPS time acquired when position measurement is performed, and performs position measurement by using the GPS time notified from the time maintenance processing unit upon a shift from the power saving mode to the normal power mode. A GPS keeping method is also disclosed.

14 Claims, 10 Drawing Sheets

PORTABLE TERMINAL AND GPS TIME KEEPING METHOD

BACKGROUND OF THE INVENTION

The present invention relates to a portable terminal such as a cellular phone or PHS which is equipped with the GPS function of specifying the current position of the terminal by receiving radio waves from a GPS (Global Positioning System) satellite and, more particularly, to a GPS time keeping method of keeping a GPS time.

Figure 11:
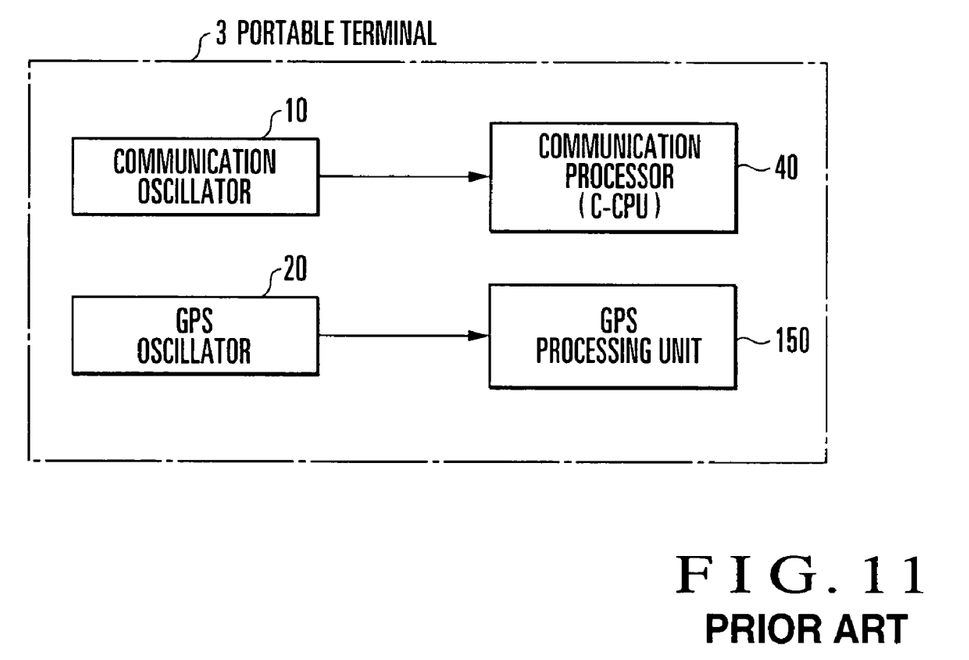
FIG. 11 is a block diagram showing the arrangement of a conventional portable terminal equipped with the GPS function.

Recently, portable terminals such as cellular phones and PHSs which have self position search functions based on the GPS have been proposed. FIG. 11 shows a conventional portable terminal 3 equipped with such a GPS function.

As shown in FIG. 11, the conventional portable terminal 3 includes a communication oscillator 10, GPS oscillator 20, communication processor (C-CPU) 40, and GPS processing unit 150.

The communication oscillator 10 is an oscillator for generating clocks to the communication processor 40. The GPS oscillator 20 is an oscillator for generating clocks to the GPS processing unit 150. The clocks generated by the communication oscillator 10 are input as operation clocks to the communication processor 40. The clocks generated by the GPS oscillator 20 are input as operation clocks to the GPS processing unit 150.

The GPS processing unit 150 receives a radio wave from each GPS satellite, and calculates the distance to each GPS satellite from the difference between the time information contained in this radio wave and the time when the radio wave was received. In order to perform high-accuracy position measurement, both the time in a GPS satellite on the transmitting side and the time in a GPS receiver on the receiving side must be accurate.

Each GPS satellite is equipped with an atomic clock, and hence the time information contained in the radio wave transmitted from each GPS satellite is high in accuracy. It is, however, difficult to mount such a high-accuracy timepiece in a GPS receiver. It is physically impossible for a device required to achieve reductions in size and power consumption, e.g., a portable terminal, in particular, to have a timepiece means with as high accuracy as an atomic clock.

For this reason, a general GPS receiver obtains a high-accuracy time by using the time information contained in radio waves received from a plurality of GPS satellites. The distance to each GPS satellite is calculated using this high-accuracy time. The time calculated from the radio wave from each GPS satellite is called the GPS time.

Since this GPS time is very accurate, various types of apparatuses designed to perform high-accuracy clocking by using the GPS time have been proposed (see, for example, Japanese Patent Laid-Open No. 2002-148372). A radio communication system has also been proposed, in which both a transmitter and a receiver use the GPS time to establish synchronization so as to be synchronized with each other.

However, not all general portable terminals such as cellular phones and PHSs (Personal Handy-phone Systems) are equipped with the GPS function. For this reason, a communication scheme asynchronous with the GPS time is used between a base station and a cellular phone. Assume that the GPS function is provided in a cellular phone based on a communication scheme asynchronous with the GPS time. In this case, if the GPS time is calculated for each position measurement, it takes much time for position measurement. For this reason, the GPS time is kept once it is obtained, and next position measurement is performed by using the kept GPS time, thereby shortening the position measurement time and improving the position measurement performance. A portable terminal is, however, required to save power consumption, and hence may be shifted to the power saving mode. In addition, the power of the cellular phone is not always ON, and is turned off in some cases. Note that in this specification, all the cases wherein the power is shut down, e.g., a normal power saving mode and power-off state, will be expressed as power saving modes.

It is generally known that knowing a more accurate GPS time makes it possible to acquire the GPS time more quickly after the start of position measurement processing, and acquiring the GPS time more quickly makes it possible to improve the position measurement performance. For this reason, even if the power saving mode is set, keeping a time as close to the GPS time as possible can shorten the position measurement time after returning from the power saving mode.

A conventional method of keeping the GPS time when such a power saving mode is activated will be described with reference to FIG. 12.

Figure 12:
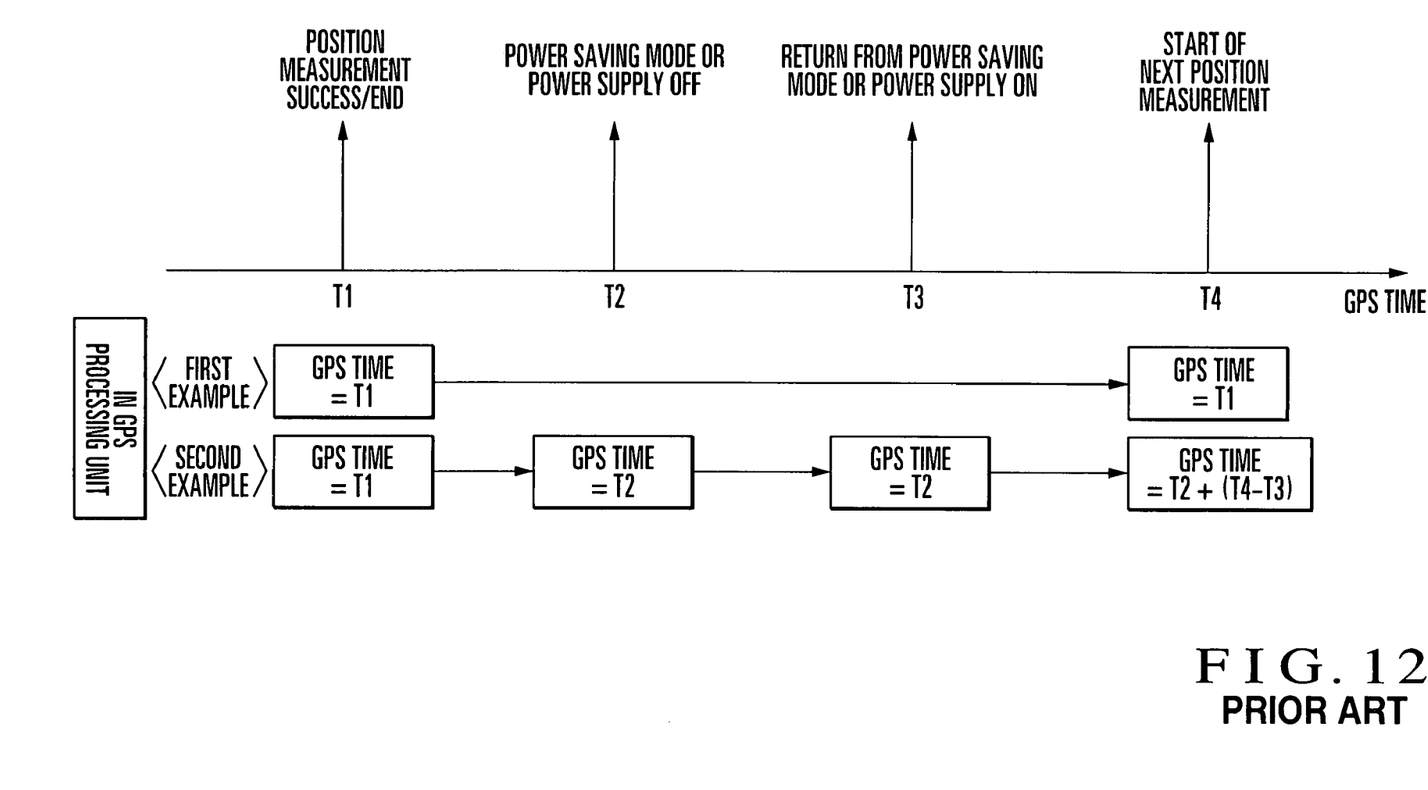
FIG. 12 is a timing chart showing the operation of the conventional portable terminal equipped with the GPS function.

FIG. 12 shows, on the GPS time axis, processing from the time the GPS processing unit 150 finishes position measurement (time T1) to the time the portable terminal shifts to the power saving mode (time T2), returns from the power saving mode (time T3), and then starts the next position measurement (time T4). FIG. 12 shows two examples.

The <first example> will be described first. At time T1, position measurement is finished. At this time, time T1 is also set as the GPS time in the GPS processing unit 150. However, the GPS processing unit 150 does not keep the GPS time when position measurement is finished. At the time point when the next position measurement is started, the GPS time remains as time T1 in the GPS processing unit 150.

The <second example> will be described next. At time T1, position measurement is finished. At this time, time T1 is also set as the GPS time in the GPS processing unit 150. Thereafter, the GPS processing unit 150 continuously keeps the GPS time by using a GPS oscillator frequency from the GPS oscillator 20 until the portable terminal enters the power saving mode or the power is turned off.

When the GPS processing unit 150 enters the power saving mode, the unit stops keeping the GPS time. After the portable terminal returns from the power saving mode, the GPS time in the GPS processing unit 150 remains as time T2. After the portable terminal returns from the power saving mode, the GPS processing unit 150 continuously keeps the GPS time by using the GPS oscillator frequency. At the time of the start of the next position measurement, however, the GPS time in the GPS processing unit 150 becomes T2+(T4−T3).

According to the conventional method of keeping the GPS, however, in the second example as well, the GPS time cannot be kept during the power saving mode, and hence an accurate GPS time cannot be known at the time of the start of the next position measurement.

A method of keeping the GPS time with high accuracy even if no GPS time information can be received from a GPS satellite is disclosed (see, for example, Japanese Patent Laid-Open No. 2000-332678). This method is, however, designed to adjust the oscillation frequency of an oscillator in an apparatus during reception of GPS radio waves, and hence requires a circuit for adjusting the oscillation frequency. In addition, this method is required to make the oscillator continuously operate, and hence cannot be applied to the above system designed to shift to the power saving mode.

The above portable terminal equipped with the conventional GPS function cannot keep the GPS time during the power saving mode. It takes therefore much time to perform position measurement after returning from the power saving mode.

SUMMARY OF THE INVENTION

It is an object of the present invention to provide a portable terminal equipped with a GPS function which can greatly improve position measurement function, even if the terminal has shifted to the power saving mode and a GPS processing unit performs no position measurement for a long period of time, by calculating a more accurate GPS time when position measurement is started next, and a GPS time keeping method.

In order to achieve the above object, according to the present invention, there is provided a portable terminal comprising a GPS processing unit which receives a radio wave from a GPS satellite and specifies a current position, and an RTC oscillator which continuously generates and outputs real time clocks even in a power saving mode, the GPS processing unit including a free-run RTC counter which continuously counts real time clocks generated by the RTC oscillator even in the power saving mode, a time maintenance processing unit which includes a memory storing a count value of the free-run RTC counter and a notified GPS time upon a shift from a normal power mode to the power saving mode, calculates a duration of the power saving mode from a difference between the count value stored in the memory and the count value read from the free-run RTC counter upon return from the power saving mode to the normal power mode, and calculates a current GPS time by adding the calculated duration of the power saving mode to the GPS time stored in the memory upon a shift from the normal power mode to the power saving mode, and a position measurement processing unit which performs position measurement by receiving a radio wave from the GPS satellite in the normal power saving mode, also notifies the time maintenance processing unit of a GPS time acquired when position measurement is performed, and performs position measurement by using the GPS time notified from the time maintenance processing unit upon a shift from the power saving mode to the normal power mode.

DESCRIPTION OF THE PREFERRED EMBODIMENTS

The embodiments of the present invention will be described in detail next with reference to the accompanying drawings.

First Embodiment

Figure 1:
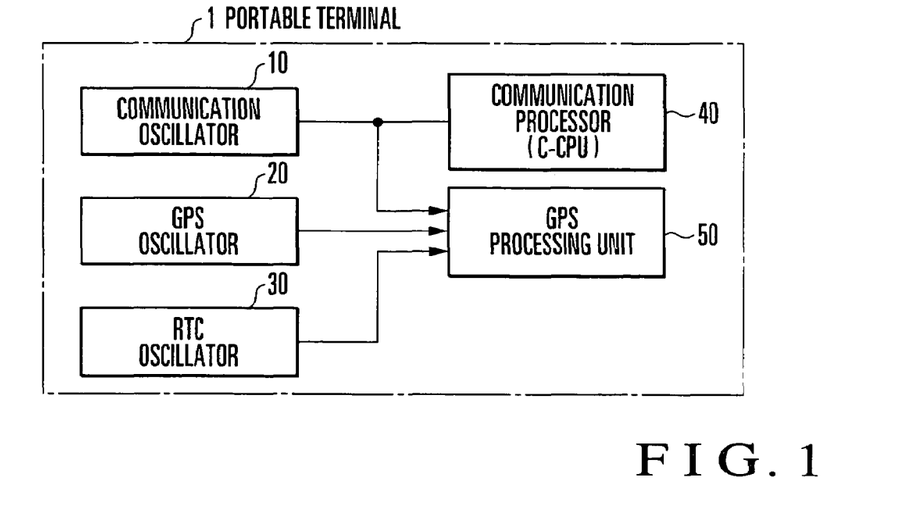
FIG. 1 is a block diagram showing the arrangement of a portable terminal according to the first embodiment of the present invention which is equipped with a GPS function.

The same reference numerals as in FIG. 11 denote the same parts in FIG. 1, and hence a description thereof will be omitted.

A portable terminal 1 according to this embodiment includes a communication oscillator 10, a GPS oscillator 20, RTC (Real Time Clock) oscillator 30, a communication processor 40, and a GPS processing unit 50 which receives radio waves from a GPS satellite and specifies the current position of the portable terminal.

The communication oscillator 10 is an oscillator for generating a clock to the communication processor 40. The clock generated by the communication oscillator 10 is input as an operation clock to the communication processor 40. The output frequency of the communication oscillator 10 is also input as a maintenance frequency for time maintenance (time correction), which is a function of the GPS processing unit 50, to the GPS processing unit 50.

The GPS oscillator 20 is an oscillator for generating a clock to a GPS processing unit 50. The clock generated by the GPS oscillator 20 is input as an operation clock to the GPS processing unit 50.

The RTC oscillator 30 is an oscillator which is provided for time stamp in the terminal to continuously generate and output real time clocks. The real time clocks generated by the RTC oscillator 30 are input to an RTC counter in the GPS processing unit 50. Note that a general RTC frequency has an accuracy of about 100 ppm.

The communication processor 40 has a function of correcting a communication oscillator frequency, which is the output frequency of the communication oscillator 10, to an accuracy equivalent to the oscillator which a base station has by communicating with the base station. During activation of this function, the output frequency of the communication oscillator 10 is normally a frequency with a high accuracy of about 0.1 ppm.

The GPS processing unit 50 can improve synchronization accuracy for the GPS time by using this high-accuracy communication oscillator frequency as a maintenance frequency for time correction.

Figure 2:
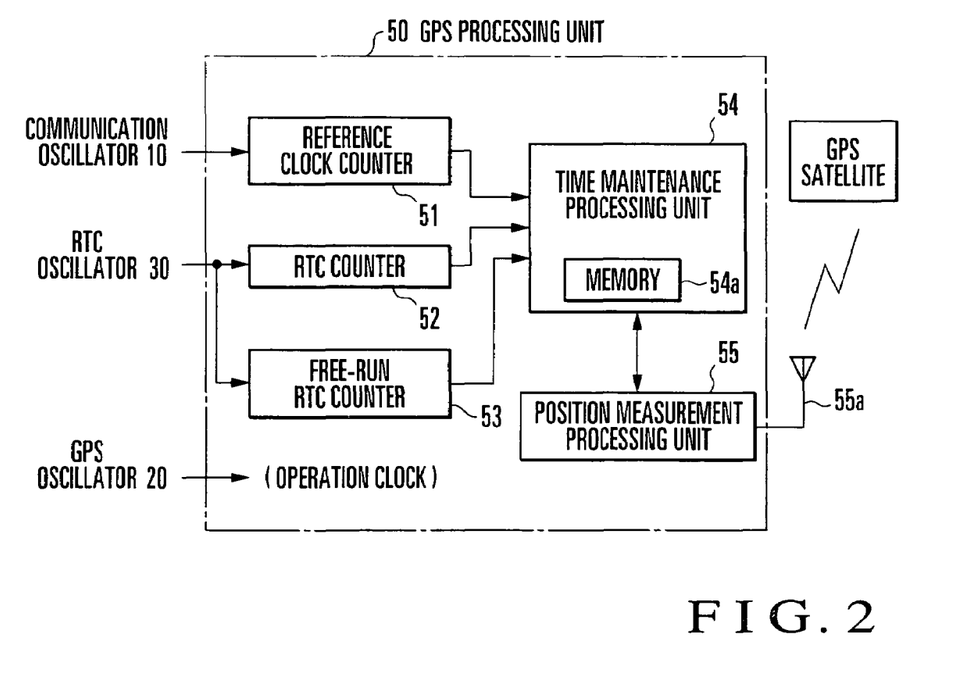
FIG. 2 is a block diagram showing the arrangement of a GPS processing unit 50 in FIG. 1.

FIG. 2 shows the internal arrangement of the GPS processing unit 50 shown in FIG. 1. The GPS processing unit 50 includes a reference clock counter 51, RTC counter 52, free-run RTC counter 53, time maintenance processing unit 54, and position measurement processing unit 55, as shown in FIG. 2.

The reference clock counter 51 counts communication oscillator clocks input to the GPS processing unit 50 as reference clocks (RefClks).

The RTC counter 52 and free-run RTC counter 53 count the clocks generated by the RTC oscillator 30.

The free-run RTC counter 53 is designed to continuously operate as long as the power of the portable terminal 1 is kept on. Even if, therefore, the portable terminal 1 is set in the power saving mode, the free-run RTC counter 53 continuously counts clocks from the RTC oscillator 30; the start and end of the operation of the free-run RTC counter 53 are not controlled.

The time maintenance processing unit 54 stores the count value of the free-run RTC counter 53 and the GPS time notified from the position measurement processing unit 55 in a memory 54a when the terminal shifts to the power saving mode. When the terminal returns from the power saving mode, the time maintenance processing unit 54 reads the count value of the free-run RTC counter 53 again, and calculates the duration of the power saving mode from the difference between the count value stored in the memory 54a and the read count value. The time maintenance processing unit 54 calculates the current GPS time by adding the calculated duration of the power saving mode to the GPS time which is stored in the memory 54a and at which the terminal shifted to the power saving mode, and outputs the calculated time to the position measurement processing unit 55.

The time maintenance processing unit 54 causes the reference clock counter 51 and RTC counter 52 to simultaneously operate for a predetermined interval of time in a non-power saving mode, i.e., a normal power mode. The time maintenance processing unit 54 calculates in advance an error in the frequency of the real time clock generated by the RTC oscillator 30 by comparing the count value of the reference clock counter 51 and the count value of the RTC counter 52 at the end of the predetermined interval of time, and holds the calculated error in the memory 54a. In calculating the duration of the power saving mode, the time maintenance processing unit 54 performs arithmetic operation for compensating for the error in the real time clock on the basis of the calculated value held in the memory 54a.

The position measurement processing unit 55 receives radio waves from a GPS satellite to measure the current position of the terminal, and notifies the time maintenance processing unit 54 of the GPS time obtained at the time of position measurement. When the terminal returns from the power saving mode, the position measurement processing unit 55 receives the corrected GPS time from the time maintenance processing unit 54, and performs position measurement by using the received GPS time.

In this manner, in this embodiment, a clock from the communication oscillator 10 which can normally keep a high-accuracy frequency is input as a reference clock to the GPS processing unit 50. In addition, in the embodiment, in the GPS processing unit 50, the reference clock counter 51 counts reference clocks, and the RTC counter 52 counts RTCs. The time maintenance processing unit 54 simultaneously controls the two counters, i.e., the reference clock counter 51 and RTC counter 52, to read out their count values, thereby obtaining RTC frequency error information in advance in this embodiment.

When, therefore, the terminal enters the power saving mode and performs no position measurement for a long period of time after the GPS time is acquired once, the time maintenance processing unit 54 measures the duration of the power saving mode by reading out the value of the free-run RTC counter 53. In addition, the time maintenance processing unit 54 calculates an error in the RTC frequency by using the reference clock counter 51 and RTC counter 52 to remove the corresponding error factor when starting position measurement next. As a consequence, the GPS processing unit 50 calculates a GPS time much more accurate than the GPS time calculated by conversion using only the RTC count value containing the error. This makes it possible to improve the performance of the position measurement processing unit 55.

Note that in the power saving mode, only the power of the free-run RTC counter 53 is on. In the power saving mode, therefore, the GPS processing unit 50 keeps counting RTCs. The general RTC frequency is several 10 kHz, and the power consumption of the free-run RTC counter 53 is lower than that of the reference clock counter 51 which counts reference clocks having a frequency of about 10 to 20 MHz.

The operation of the portable terminal 1 of this embodiment will be described in detail next with reference to FIG. 3.

Figure 3:
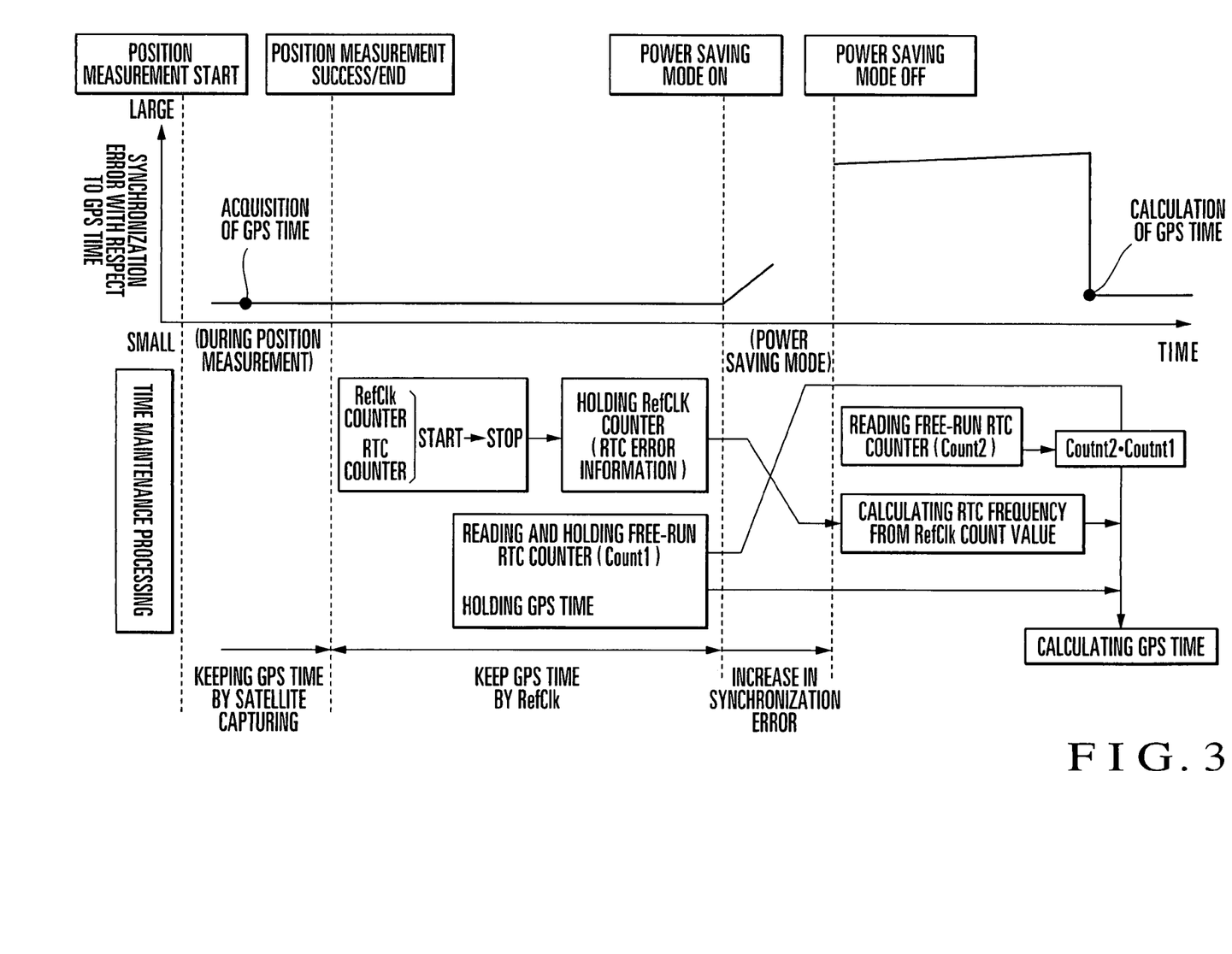
FIG. 3 is a timing chart showing the operation of the portable terminal according to the first embodiment which is equipped with the GPS function.

Assume that the GPS processing unit 50 has not acquired the GPS time yet in FIG. 3. In this state, the GPS processing unit 50 can perform position measurement by receiving a satellite signal and analyzing the navigation data contained in the signal even if the unit has no GPS time or other data used for position measurement processing.

Upon successfully performing position measurement, the GPS processing unit 50 simultaneously acquires the GPS time. After successful position measurement, in the GPS processing unit 50, in order to keep accurate GPS time until the next position measurement, the time maintenance processing unit 54 performs a series of processes (to be described below) in the respective steps up to the next position measurement. This series of processes will be referred to as time maintenance processing hereinafter. This series of processes will be described below.

First of all, the time maintenance processing unit 54 obtains the error information of the RTC frequency generated by the RTC oscillator 30. The time maintenance processing unit 54 obtains the error information of the RTC frequency by comparing the number of RTC clocks counted by the RTC counter 52 with the number of reference clocks counted by the reference clock counter 51 on the assumption that clocks input as reference clocks to the GPS processing unit 50 have an accurate frequency. More specifically, the time maintenance processing unit 54 simultaneously starts the reference clock counter 51 and RTC counter 52 and simultaneously stops them.

Thereafter, if the RTC frequency is accurate, the error information of RTCs is determined by comparing the ideal reference clock count value which the reference clock counter 51 should indicate with the count value actually indicated by the reference clock counter 51.

A practical example of the method of obtaining the error information of the RTC frequency will be described below.

Assuming that the reference clock is set to 19.2 MHz, and the RTC is set to 32.768 kHz, the reference clock counter 51 counts reference clocks while the RTC counter 52 counts 32,768 RTCs.

If the RTC frequency is accurate, since the reference clock counter 51 counts reference clocks for an interval of 1 sec, the count value of the reference clock counter 51 ideally becomes 19,200,000. Assume that the count value indicated by the reference clock counter 51 is 19,200,900. The reason why the reference clock count value deviates at this time is that the count interval, which should be 1 sec, has deviated from 1 sec because of an error in the RTC frequency on the assumption that the reference clock frequency is accurate. On the basis of this deviation of the reference clock count value, the time maintenance processing unit 54 obtains an RTC frequency as follows:

32.768 kHz (designed RTC frequency value)×{19, 200,000 (ideal reference clock count value)/19, 200,900 (actual reference clock count value)}=32.76646407 kHz In this example, since the RTC frequency is lower than the designed value, the interval during which the reference clock counter 51 counts reference clocks becomes longer than 1 sec. As a consequence, the reference clock count value becomes larger than the ideal value.

An actual RTC frequency can be obtained in this manner. At this point of time, however, the time maintenance processing unit 54 holds only the count value of the reference clock counter 51 as the error information of the RTC frequency in the memory 54*a*.

The GPS processing unit 50 then makes a preparation for the power saving mode. The time maintenance processing unit 54 reads out the value of the free-run RTC counter 53 before the GPS processing unit 50 is set in the power saving mode, and holds the value (Count1) and the GPS time in association with the value in the memory 54*a*.

The time maintenance processing unit 54 or communication processor 40 shifts the GPS processing unit 50 to the power saving mode. While the GPS processing unit 50 is set in the power saving mode, the free-run RTC counter 53 keeps counting RTCs. The free-run RTC counter 53 counts RTCs with the number of digits sufficiently large to the extent that no practical problem arises, no overflow occurs. In addition, the GPS processing unit 50 cannot maintain the GPS time during the power saving mode.

The time maintenance processing unit 54 or communication processor 40 causes the GPS processing unit 50 to return from the power saving mode.

After the GPS processing unit 50 returns from the power saving mode, time maintenance processing is performed. After the GPS processing unit 50 returns from the power saving mode, the time maintenance processing unit 54 reads out the value of the free-run RTC counter 53. Assume that the count value read out in this case is represented by Count2.

The time maintenance processing unit 54 calculates the time interval from the instant at which the GPS time is held before the power saving mode to the instant at which the value of the free-run RTC counter 53 is read out after the return from the power saving mode according to Count2−Count1, each of which is an RTC count value, by comparison with the value held in the memory 54*a* before the power saving mode.

The time maintenance processing unit 54 can obtain an accurate time corresponding to the above RTC count value on the basis of the error information of the RTCs held in the memory 54*a* before the power saving mode. The time maintenance processing unit 54 can therefore calculate the GPS time after the return from the power saving mode by adding the above time to the GPS time held in the memory 54*a*.

An example of the method of calculating the GPS time after the return from the power saving mode will be described.

A GPS time is obtain in a case wherein the error information (reference clock count value) of RTCs held in the memory 54*a* before the power saving mode is 1,900,900, the free-run RTC counter value (Count1) held in the memory 54*a* before the power saving mode is 70,000,000, the GPS time held in the memory 54*a* before the power saving mode is 1250 (GPS week) and 302,400,000 msec (Time of Week), and the free-run RTC counter value (Count2) after the return from power saving mode is 187,964,800.

First of all, the time interval from the instant which the GPS time is held before the power saving mode to the instant at which the value of the free-run RTC counter 53 is read out after return from the power saving mode by using the RTC count value.

187964800 (after return from power saving mode)−70000000 (before power saving mode)=117964800.

An RTC frequency is then obtained from the error information of RTCs by the above method.

RTC frequency: 32.76646407 kHz

The time taken to count 117,964,800 RTCs having the above frequency is obtained as follows:

117964800/32.76646407 kHz=3600.16875 s

Therefore, when the value of the time maintenance processing unit 54 is read out after the return from the power saving mode, a GPS time is obtained as follows:

302400000 msec (Time of Week)+3600.16875 s×1000=306000168.875 (Time of Week)

(If the result exceeds 604,800,000 (one week), Time of Week is obtained by subtracting 604,800,000 from the result.)

The time maintenance processing has been described above. The time maintenance processing unit 54 sends out the GPS time calculated by the above method to the position measurement processing unit 55 before the start of the next position measurement.

As described above, according to the GPS time keeping method for the portable terminal 1 of this embodiment, when the position measurement processing unit 55 starts position measurement after return from the power saving mode, the time maintenance processing unit 54 calculates the current GPS time on the basis of the GPS time acquired in the past and the time elapsed after the acquisition of the GPS time, and transfers the GPS time to the position measurement processing unit 55. According to this embodiment, therefore, once the GPS time is measured and the terminal shifts to the power saving mode, even if no position measurement is done for a long period of time after the last position measurement by the position measurement processing unit 55, the position measurement time can be shortened. This makes it possible to perform position measurement with almost the same position measurement performance as that in the case wherein position measurement is continuously performed. In addition, since the interval during which no position measurement is performed is calculated by using the value read out from the free-run RTC counter 53 having low power consumption, the power consumption required to maintain the GPS time can be reduced.

In addition since an error in the RTC frequency is calculated by using clocks from the communication oscillator 10 having high-accuracy frequency as reference clocks, the influence of the error in the RTC frequency on the calculation of the GPS time can be reduced, thus calculating a high-accuracy GPS time.

Second Embodiment

A portable terminal equipped with a GPS function according to the second embodiment of the present invention will be described next.

Figure 4:
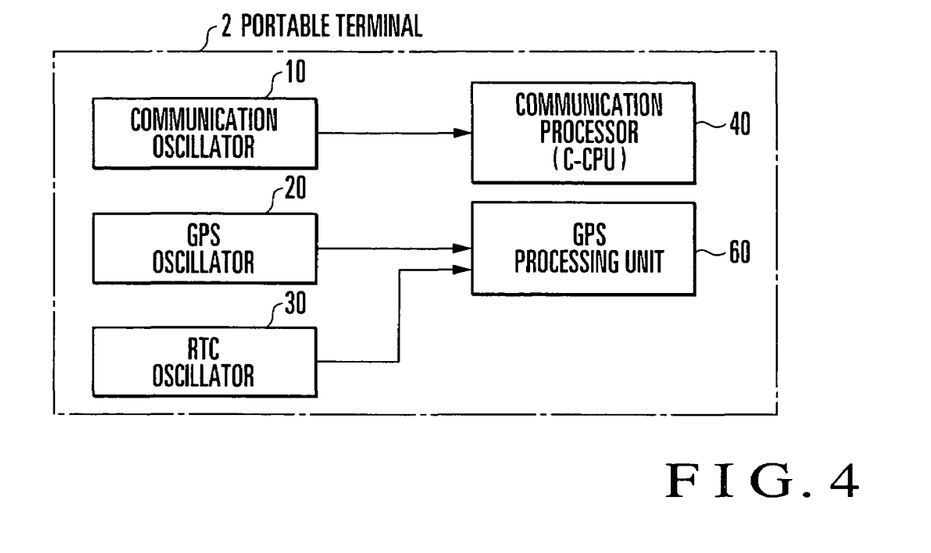
FIG. 4 is a block diagram showing the arrangement of a portable terminal according to the second embodiment of the present invention which is equipped with the GPS function.

As shown in FIG. 4, the basic arrangement of a portable terminal 2 according to this embodiment is the same as that shown in FIG. 1 except that the GPS processing unit 50 is replaced with a GPS processing unit 60. Unlike in the first embodiment described above, however, in the second embodiment, the clocks generated by a communication oscillator 10 are not input to the GPS processing unit 60.

Figure 5:
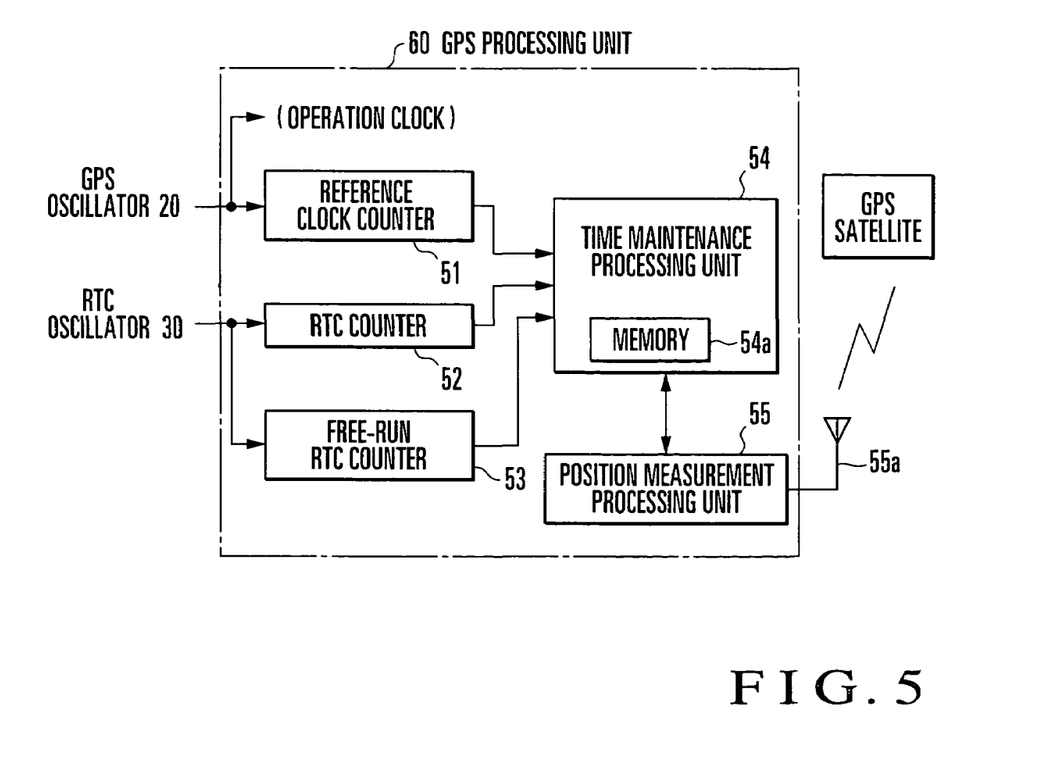
FIG. 5 is a block diagram showing the arrangement of a GPS processing unit 60 in FIG. 4.

As shown in FIG. 5, the GPS processing unit 60 in this embodiment has the same basic arrangement as that of the GPS processing unit 50 shown in FIG. 2. However, clocks input to a reference clock counter 51 are clocks generated by a GPS oscillator 20, instead of the communication oscillator 10, which are also input as operation clocks to the GPS processing unit 60.

In this embodiment, the time maintenance processing performed by a time maintenance processing unit 54 is the same as that in the first embodiment except that the clocks generated by the GPS oscillator 20 are input to the reference clock counter 51.

As described above, in this embodiment, since the clocks generated by the GPS oscillator 20 are input to the reference clock counter 51 in the GPS processing unit 60, the time maintenance processing unit 54 can always obtain RTC error information by starting the reference clock counter 51 and an RTC counter 52. This is because, since the clocks generated by the communication oscillator 10 are operation clocks for a communication processor 40, the clocks are not necessarily always input to the reference clock counter 51. In addition, it is highly possible that the communication processor 40 and communication oscillator 10 are designed to intermittently stop generating clocks in order to reduce the overall power consumption of the portable terminal.

In this embodiment, supplying the clocks generated by the GPS oscillator 20, which are operation clocks for the GPS processing unit 60, to the reference clock counter 51 makes it possible to obtain the effect of preventing an increase in the power consumption of the portable terminal in addition to the effect obtained by the first embodiment described above.

Third Embodiment

A portable terminal equipped with a GPS function according to the third embodiment of the present invention will be described next. The arrangement of the portable terminal of this embodiment is the same as that of the portable terminal 1 shown in FIG. 1. The arrangement of the portable terminal of this embodiment, however, differs from that shown in FIG. 1 in that the GPS processing unit 50 is replaced with a GPS processing unit 70 in FIG. 6.

Figure 6:
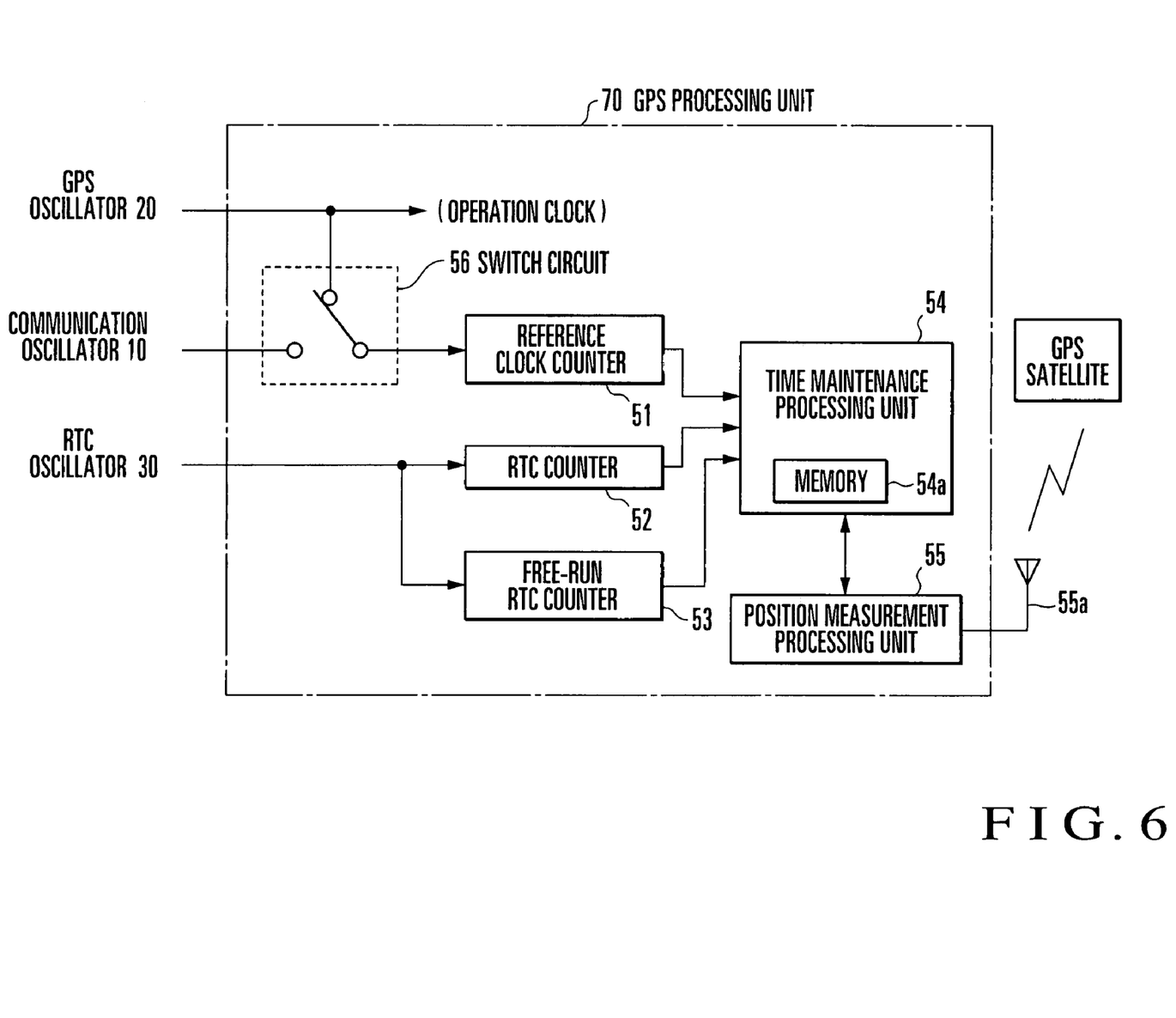
FIG. 6 is a block diagram showing the arrangement of a GPS processing unit 70 in a portable terminal according to the third embodiment which is equipped with the GPS function.

The GPS processing unit 70 of this embodiment additionally includes a switch circuit 56 with respect to the GPS processing unit 50 shown in FIG. 2.

A switch circuit 56 selects and outputs the clock generated by a communication oscillator 10 or the clock generated by a GPS oscillator 20 in accordance with an instruction from a time maintenance processing unit 54 or position measurement processing unit 55. A reference clock counter 51 in this embodiment counts the clock selected by the switch circuit 56 as a reference clock. That is, the switch circuit 56 is controlled by the time maintenance processing unit 54 or position measurement processing unit 55 to make it possible to select a clock from the communication oscillator 10 or a clock from a GPS oscillator 20 which is to be input to the reference clock counter 51.

This embodiment can perform the operation of inputting clocks from the communication oscillator 10 to the reference clock counter 51 while the communication oscillator 10 operates, and inputting clocks from the GPS oscillator 20 to the reference clock counter 51 while the communication oscillator 10 stops generating clocks. In addition to the effects obtained by the first and second embodiments described above, this embodiment can obtain the effect of allowing the maximum use of high-accuracy communication oscillator clocks while preventing an increase in the power consumption of the portable terminal.

Fourth Embodiment

A portable terminal according to the fourth embodiment of the present invention will be described next. Although the arrangement of a portable terminal of this embodiment is the same as that of each of the portable terminals of the first to third embodiments, a different time maintenance processing method is used in the fourth embodiment.

Figure 7:
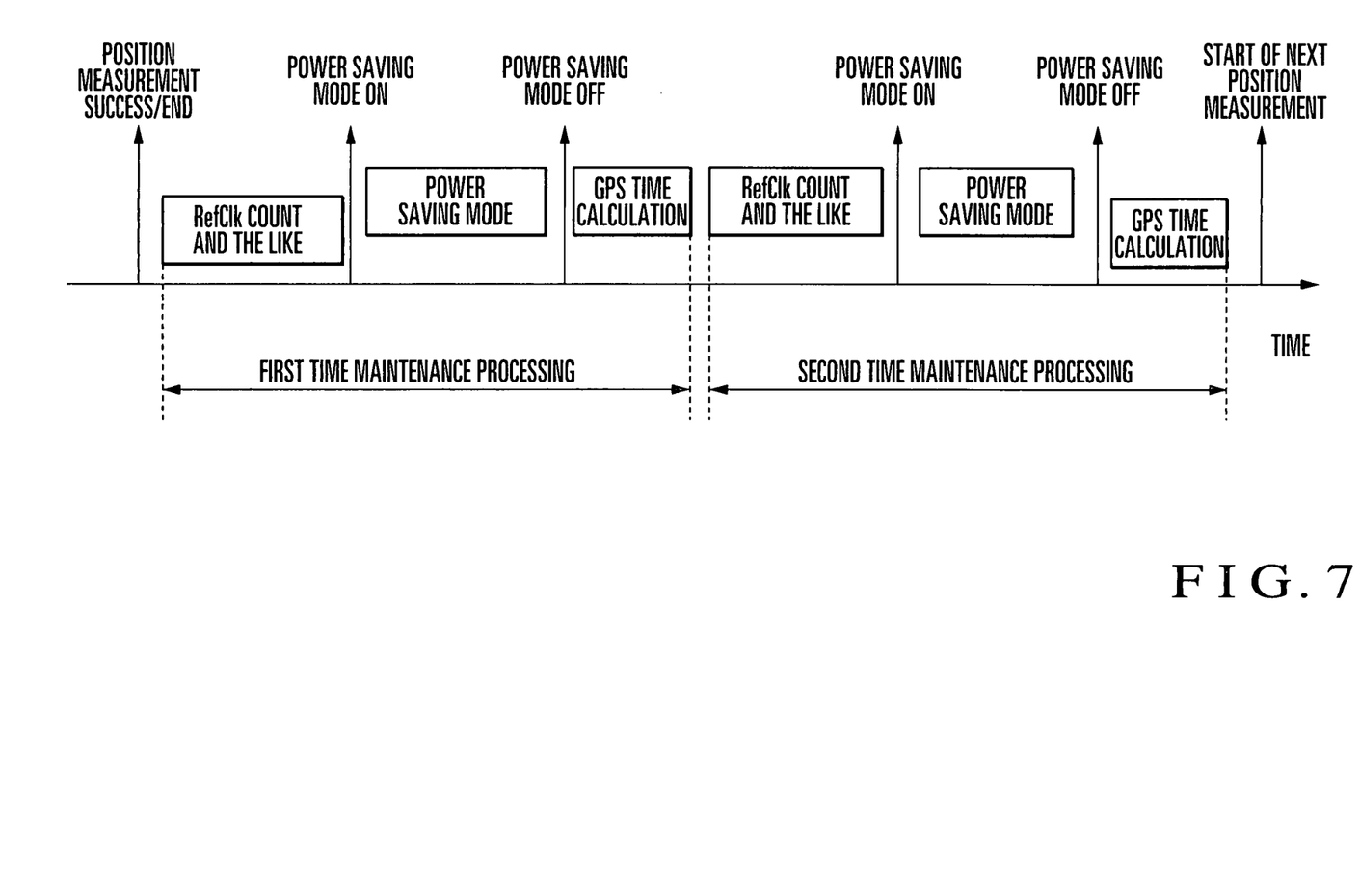
FIG. 7 is a view for explaining time maintenance processing in the fourth embodiment of the present invention.

In this embodiment, a GPS processing unit returns from the power saving mode at predetermined time intervals. When the GPS processing unit-returns from the power saving mode, a time maintenance processing unit calculates a GPS time by calculating the duration of the power saving mode, and calculates a frequency error in real time clocks by operating a reference clock counter 51 and RTC counter 52 for a predetermined interval of time.

FIG. 7 shows time maintenance processing in this embodiment. In a series of time maintenance processing operations in this embodiment, time maintenance processing is executed a plurality of number of times until the GPS processing unit starts position measurement.

Since RTCs generally used for a terminal greatly vary in frequency with changes in temperature, the RTC error information obtained by reference clock counting performed before the maintenance processing unit enters the power saving mode becomes more inaccurate as the duration of the power saving mode prolongs.

In this embodiment, time maintenance processing is periodically repeated even while the GPS processing unit performs no position measurement. For this reason, since RTC error information is periodically updated, the GPS time calculated as a result of time maintenance processing immediately before the start of position measurement becomes much more accurate as compared with the case wherein time maintenance processing is executed only once.

The effects obtained by this embodiment will be described below with reference to FIGS. 8, 9, and 10. The graphs of FIGS. 8, 9, and 10 show how the count value of a free-run RTC counter increases while the GPS processing unit is in the power saving mode.

The reason why the count value does not increase at a constant ratio is that the RTC frequency changes midway due to the influence of ambient temperature fluctuations.

Figure 8:
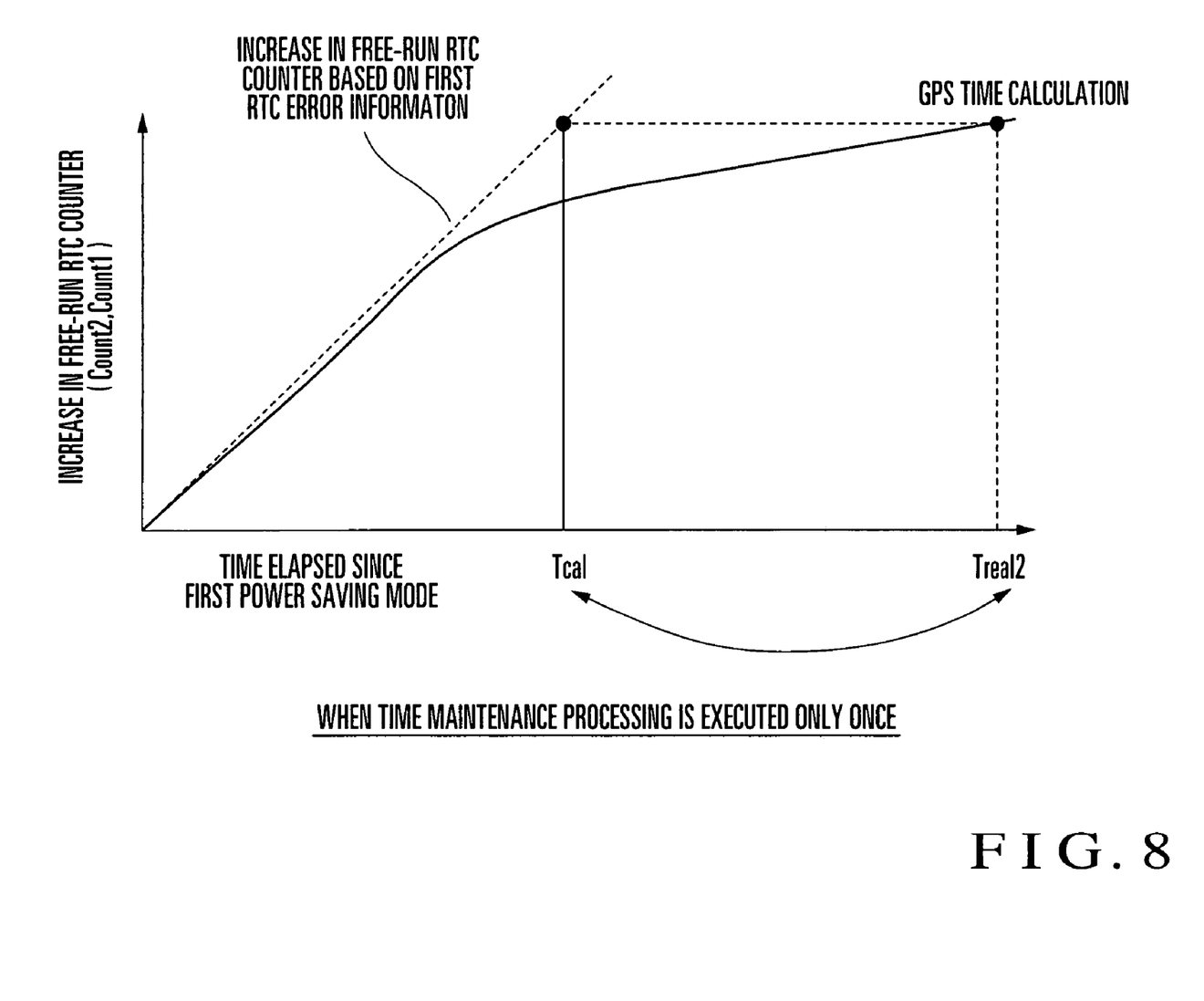
FIG. 8 is a graph showing an increase in a free-run RTC counter when time maintenance processing is executed only once.

Referring to FIG. 8, at time Treal2, when the GPS processing unit returns from the power saving mode, a GPS time is calculated on the basis of the RTC error information obtained before the unit entered the power saving mode. As a result, the GPS time corresponding to time Tcal is obtained. At this time, an error in GPS time calculation by time maintenance processing is given by Treal2−Tcal.

Figure 9:
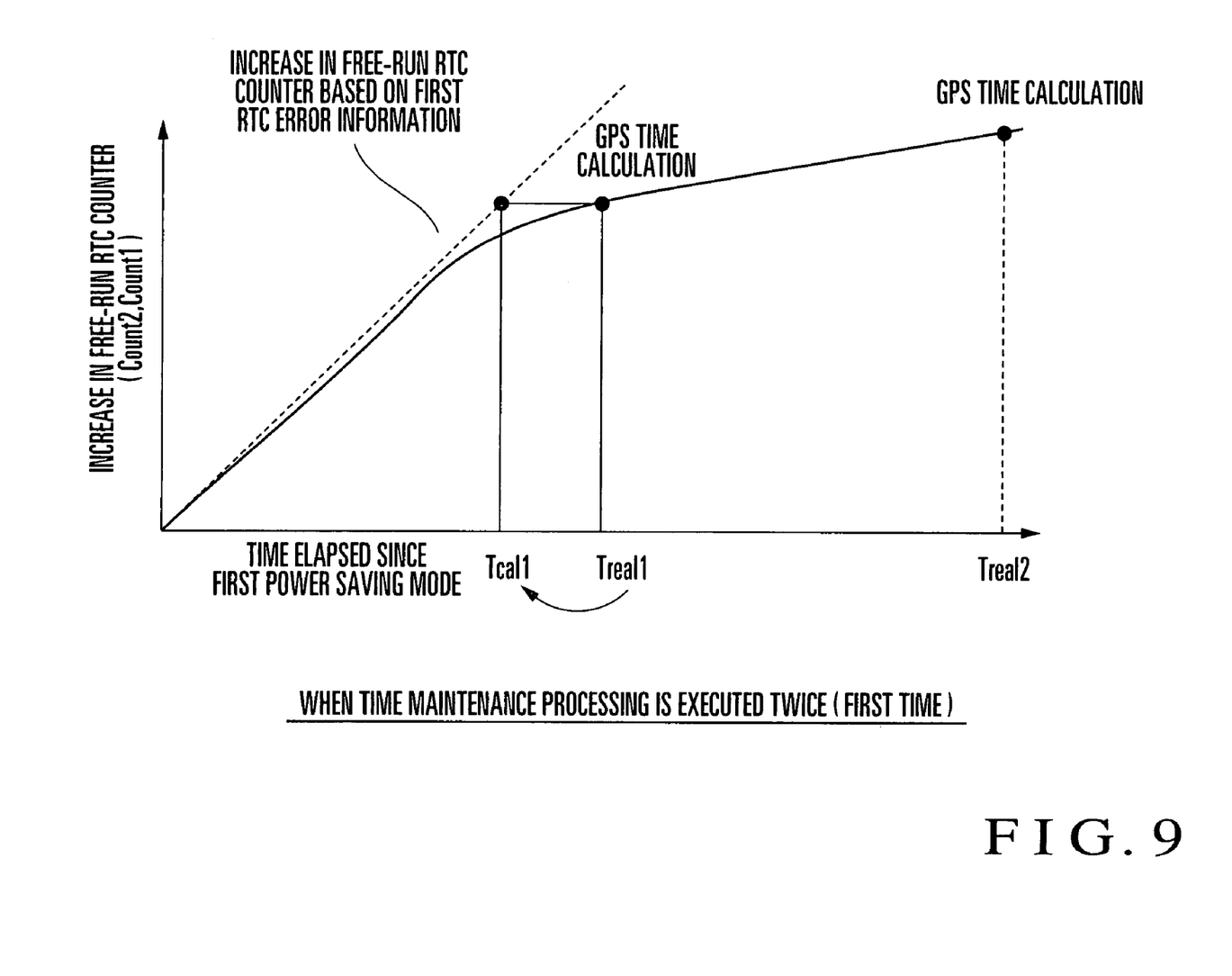
FIG. 9 is a graph for explaining the first time maintenance processing when time maintenance processing is executed twice.
Figure 10:
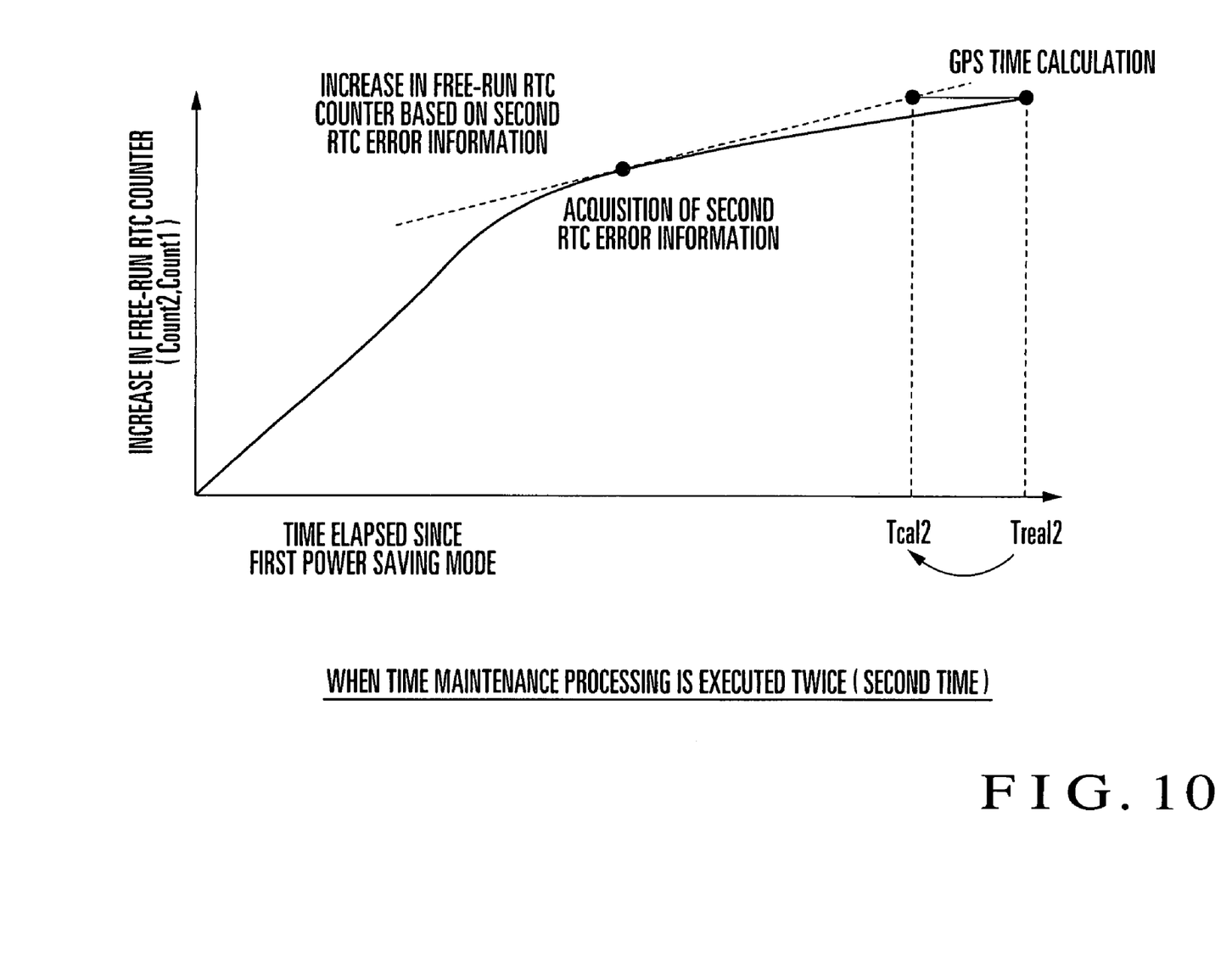
FIG. 10 is a graph for explaining the second time maintenance processing when time maintenance processing is executed twice.

Referring to FIG. 9, at time Treal1, when the GPS processing unit returns from the power saving mode, a GPS time is calculated on the basis of the RTC error information obtained before the unit entered the power saving mode. As a result, the GPS time corresponding to time Tcal1 is obtained. At this time, an error in the first GPS time calculation by time maintenance processing is given by (Treal1−Tcal1).

When the first time maintenance processing is complete, the second time maintenance processing is immediately executed. At this time, the latest RTC error information can be obtained.

Referring to FIG. 10, at time Treal2, when the GPS processing unit returns from the power saving mode, a GPS time is calculated on the basis of the RTC error information obtained before the unit entered the power saving mode for the second time. As a result, the GPS time corresponding to time Tcal2 is obtained. In addition to the error in the GPS time obtained by the first time maintenance processing, the error in the GPS time obtained by the second time maintenance processing is given as follows:

(Treal1−Tcal1)+(Treal2−Tcal2)

Executing time maintenance processing twice in this manner can calculate a GPS time more accurately as compared with the case wherein time maintenance processing is executed only once, although its effect varies depending on the start timing of the second time maintenance processing after the first time maintenance processing.

Referring to FIGS. 9 and 10, time maintenance processing is executed twice. However, the more time maintenance processing is executed, the smaller the error in the GPS time to be finally calculated becomes. That is, as the intervals at which time maintenance processing is executed while the GPS processing unit performs no position measurement is reduced, the GPS time can be kept more accurately. This improves the performance of the GPS processing unit when it performs position measurement next. However, increasing the frequency of execution of time maintenance processing will increase the number of times the GPS processing unit returns from the power saving mode, resulting in an increase in power consumption. As has been described above, according to the present invention, the following effects can be obtained:

(1) When position measurement is started, the current GPS time is calculated on the basis of the GPS time acquired in the past and the time elapsed since the acquisition of the GPS time. This makes it possible to shorten the position measurement time and improve the position measurement performance.

(2) Since the interval during which no position measurement is performed is calculated by using the value read from the free-run RTC counter having low power consumption, the power consumption required to keep the GPS time can be reduced.

(3) Calculating an error in the RTC frequency by using a clock having a high-accuracy frequency as a reference clock can eliminate the influence of the error in the RTC frequency on a GPS time calculation result.

(4) Repeating time maintenance processing periodically at predetermined intervals in the time interval from the execution of position measurement to the execution of the next position measurement can reduce the error contained in the time calculated during the power saving mode even if an error in the RTC frequency changes midway. This makes it possible to keep the GPS time with higher accuracy for a long period of time.

What is claimed is:

1. A portable terminal comprising:
a GPS processing unit which receives a radio wave from a GPS satellite and specifies a current position; and
an RTC oscillator which continuously generates and outputs real time clocks even in a power saving mode,
wherein said GPS processing unit comprises
a free run RTC counter which continuously counts real time clocks generated by said RTC oscillator even in the power saving mode,
a time maintenance processing unit which compnses a memory storing a count value of the free run RTC counter and a notified GPS time upon a shift from a normal power mode to the power saving mode, calculates a duration of the power saving mode from a difference between the count value stored in the memory and the count value read from the free run RTC counter upon return from the power saving mode to the normal power mode, and calculates a current GPS time by adding the calculated duration of the power saving mode to the GPS time stored in the memory upon a shift from the normal power mode to the power saving mode, and
a position measurement processing unit which performs position measurement by receiving a radio wave from the GPS satellite in the normal power mode, also notifies the time maintenance processing unit of a GPS time acquired when position measurement is performed, and performs position measurement by using the GPS time notified from the time maintenance processing unit upon a shift from the power saving mode to the normal power mode; and
wherein the time maintenance processing unit calculates in advance an error in a frequency of the real time clock.

2. A terminal according to claim 1, further comprising a communication oscillator for generating a clock to a communication processor,
wherein said GPS processing unit further comprises a reference clock counter for counting a clock generated by the communication oscillator as a reference clock, and
an RTC counter for counting a real time clock generated by the RTC oscillator,
wherein the time maintenance processing unit calculates in advance an error in a frequency of the real time clock by causing the reference clock counter and the RTC counter to simultaneously operate for a predetermined interval of time in the normal power mode and comparing a count value of the reference clock counter with a count value of the RTC counter at the end of the predetermined interval of time, and compensates for the error in the frequency of the real time clock when calculating a duration of the power saving mode from a difference between the count value stored in the memory and the count value read from the free run RTC counter.

3. A terminal according to claim 2, wherein
said GPS processing unit returns from the power saving mode at predetermined time intervals, and
the time maintenance processing unit calculates a GPS time by calculating a duration of the power saving time upon return from the power saving mode, and calculates an error in the frequency of the real time clock by causing the reference clock counter and the RTC counter to operate for a predetermined interval of time before occurrence of a shift to the power saving mode again.

4. A terminal according to claim 1, further comprising a GPS oscillator for generating a clock to said GPS processing unit,
wherein said GPS processing unit further comprises
a reference clock counter for counting a clock generated by said GPS oscillator as a reference clock, and
an RTC counter for counting a real time clock generated by said RTC oscillator,
wherein the time maintenance processing unit calculates in advance an error in a frequency of the real time clock by causing the reference clock counter and the RTC counter to simultaneously operate for a predetermined interval of time in the normal power mode and comparing a count value of the reference clock counter with a count value of the RTC counter at the end of the predetermined interval of time, and compensates for the error in the frequency of the real time clock when calculating a duration of the power saving mode from a difference between the count value stored in the memory and the count value read from the free run RTC counter.

5. A terminal according to claim 4, wherein
said GPS processing unit returns from the power saving mode at predetermined time intervals, and
the time maintenance processing unit calculates a GPS time by calculating a duration of the power saving time upon return from the power saving mode, and calculates an error in the frequency of the real time clock by causing the reference clock counter and the RTC counter to operate for a predetermined interval of time before occurrence of a shift to the power saving mode again.

6. A terminal according to claim 1, further comprising
a communication oscillator for generating a clock to the communication processor, and
a GPS oscillator for generating a clock to said GPS processing unit,
wherein said GPS processing unit further comprises
a switch circuit which selects and outputs one of a clock generated by said communication oscillator and a clock generated by said GPS oscillator in accordance with an instruction from the time maintenance processing unit or the position measurement processing unit,
a reference clock counter for counting a clock selected by the switch circuit as a reference clock, and
an RTC counter for counting a real time clock generated by the RTC oscillator,
wherein the time maintenance processing unit calculates in advance an error in a frequency of the real time clock by causing the reference clock counter and the RTC counter to simultaneously operate for a predetermined interval of time in the normal power mode and comparing a count value of the reference clock counter with a count value of the RTC counter at the end of the predetermined interval of time, and compensates for the error in the frequency of the real time clock when calculating a duration of the power saving mode from a difference between the count value stored in the memory and the count value read from the free run RTC counter.

7. A terminal according to claim 6, wherein
said GPS processing unit returns from the power saving mode at predetermined time intervals, and
the time maintenance processing unit calculates a GPS time by calculating a duration of the power saving time upon return from the power saving mode, and calculates an error in the frequency of the real time clock by causing the reference clock counter and the RTC counter to operate for a predetermined interval of time before occurrence of a shift to the power saving mode again.

8. A method of keeping a GPS time in a portable terminal equipped with a GPS function of specifying a current position by receiving a radio wave from a GPS satellite, comprising:
storing a count value of a free run RTC counter which continuously counts real time clocks, even during a power saving mode, and a notified GPS time upon a shift from a normal power mode to the power saving mode;
calculating a duration of the power saving mode from a difference between the stored count value and a count value read from the free run RTC counter upon return from the power saving mode to the normal power mode;
calculating a current GPS time by adding the calculated duration of the power saving mode to the stored GPS time upon a shift from the normal power mode to the power saving mode; and
calculating in advance an error in a frequency of the real time clock.

9. A method according to claim 8, further comprising:
causing a reference clock counter and an RTC counter to simultaneously operate for a predetermined interval of time in the normal power mode, the reference clock counter being adapted to count clocks used as operation clocks in a communication processor as reference clocks, and the RTC counter being adapted to count real time clocks;
calculating in advance an error in a frequency of the real time clock by comparing a count value of the reference clock counter and a count value of the RTC counter after the predetermined interval of time; and
compensating for the error in the frequency of the real time clock when the duration of the power saving mode is to be calculated from a difference between the stored count value and the count value read from the free run RTC counter.

10. A method according to claim 9, further comprising:
returning from the power saving mode at predetermined time intervals, and calculating a duration of the power saving mode upon return from the power saving mode; and
calculating an error in the frequency of the real time clock by causing the reference clock counter and the RTC counter to operate for a predetermined interval of time before occurrence of a shift to the power saving mode again.

11. A method according to claim 8, further comprising:
causing a reference clock counter and an RTC counter to simultaneously operate for a predetermined interval of time in the normal power mode, the reference clock counter being adapted to count clocks used as operation clocks in a GPS processing unit as reference clocks, and the RTC counter being adapted to count real time clocks;
calculating in advance an error in a frequency of the real time clock by comparing a count value of the reference clock counter and a count value of the RTC counter after the predetermined interval of time; and compensating for the error in the frequency of the real time clock when the duration of the power saving mode is to be calculated from a difference between the stored count value and the count value read from the free run RTC counter.

12. A method according to claim 11, further comprising:

returning from the power saving mode at predetermined time intervals, and calculating a duration of the power saving mode upon return from the power saving mode; and calculating an error in the frequency of the real time clock by causing the reference clock counter and the RTC counter to operate for a predetermined interval of time before occurrence of a shift to the power saving mode again.

13. A method according to claim 8, further comprising:

selecting one of a clock used as an operation clock in a communication processor and a clock used as an operation clock in a GPS processing unit;

causing a reference clock counter for counting the selected clock as a reference clock and an RTC counter for counting a real time clock to simultaneously operate for a predetermined interval of time in the normal power mode;

calculating in advance an error in a frequency of the real time clock by comparing a count value of the reference clock counter and a count value of the RTC counter after the predetermined interval of time; and compensating for the error in the frequency of the real time clock when the duration of the power saving mode is to be calculated from a difference between the stored count value and the count value read from the free run RTC counter.

14. A method according to claim 13, further comprising:

returning from the power saving mode at predetermined time intervals, and calculating a duration of the power saving mode upon return from the power saving mode; and calculating an error in the frequency of the real time clock by causing the reference clock counter and the RTC counter to operate for a predetermined interval of time before occurrence of a shift to the power saving mode again.

* * * * *